United States Patent [19]

Narita

[11] Patent Number: 4,530,038
[45] Date of Patent: Jul. 16, 1985

[54] CANCELLATION DEVICE FOR CANCELLING A TEMPORARY STOP MODE IN A RECORDING AND/OR REPRODUCING APPARATUS

[75] Inventor: Shuichi Narita, Yamato, Japan

[73] Assignee: Victor Company of Japan, Ltd., Japan

[21] Appl. No.: 532,588

[22] Filed: Sep. 16, 1983

[30] Foreign Application Priority Data

Sep. 28, 1982 [JP] Japan .............................. 57-169236

[51] Int. Cl.³ .............................................. G11B 15/00
[52] U.S. Cl. .................................. 360/74.1; 360/10.3; 360/69; 360/71
[58] Field of Search ................... 360/10.3, 69, 71, 74.1

[56] References Cited

U.S. PATENT DOCUMENTS 4,385,330 5/1983 Serafini ................................ 360/71

*Primary Examiner*—George G. Stellar
*Attorney, Agent, or Firm*—Andrus, Sceales, Starke & Sawall

[57] ABSTRACT

A temporary stop mode cancellation device for cancelling a temporary stop mode in which the tape travel of a magnetic tape is temporarily stopped in a recording and/or reproducing apparatus, comprises a timer for producing a first signal when a first predetermined time interval T1 elapses from a time when the recording and/or reproducing apparatus is set to a mode in which the rotation of a capstan motor is temporarily stopped and the tape travel of a magnetic tape is temporarily stopped, and for producing a second signal when a second predetermined time interval T3 elapses from a time when the first predetermined time interval T1 has elapsed. The cancellation device further comprises a control circuit for producing a third signal for stopping the rotation of a take-up reel motor, and for producing a fourth signal during a third predetermined time interval T4 so as to rotate the capstan motor in a direction in reverse to a normal rotating direction of the capstan motor and to move the magnetic tape in a reverse direction, when supplied with the first signal from the timer means. The control circuit also produces a fifth signal for stopping the rotation of a head motor which rotates heads which record and/or reproduce a signal onto and/or from the magnetic tape, when supplied with the second signal from the timer means.

5 Claims, 13 Drawing Figures

CANCELLATION DEVICE FOR CANCELLING A TEMPORARY STOP MODE IN A RECORDING AND/OR REPRODUCING APPARATUS

BACKGROUND OF THE INVENTION

The present invention generally relates to cancellation devices for cancelling a temporary stop mode in which the tape travel is temporarily stopped in recording and/or reproducing apparatuses, and more particularly to a cancellation device for a recording and/or reproducing apparatus, designed to automatically cancel a temporary stop mode in which the tape travel is temporarily stopped so as to temporarily stop a recording operation or to carry out a still-picture reproduction, after a predetermined time has elapsed.

A helical scan type magnetic recording and reproducing apparatus for recording and reproducing a video signal, records and reproduces the video signal onto and from tracks which are formed obliquely to the longitudinal direction of a magnetic tape, by use of rotary heads. Generally, in such a recording and reproducing apparatus, the tape travel is temporarily stopped when the mode of the apparatus is set to a still-picture reproduction mode among the reproducing modes. In this still-picture reproduction mode, the rotary heads repeatedly scan over the same track on the tape, so as to obtain a still reproduction picture. In addition, when the mode of the apparatus is set to a so-called pause mode during a recording mode, so as to temporarily stop the recording operation, the rotary heads continues to rotate but the tape travel is temporarily stopped. In this pause mode, the apparatus is in a waiting state and waits for the recording mode to be resumed.

During the temporary stop mode in which the tape travel is temporarily stopped, the rotary heads continue to rotate and repeatedly scan over the same track on the magnetic tape which is stationary. Accordingly, if this temporary stop mode is continued for a long period of time, the magnetic layer on the magnetic tape may become scraped off by the rotary heads. Further, magnetic particles or powder formed as the rotary heads scrape off the magnetic layer of the magnetic tape, may fill the gaps of the rotary heads.

Thus, the conventional recording and reproducing apparatus was designed so that when it is detected that the temporary stop mode such as the still-picture reproduction mode and the pause mode has continued for a predetermined time, the tape tension is reduced. However, if the tape tension is simply reduced, the tape tension cannot be sufficiently reduced around the periphery of the rotary drum which carries the rotary heads due to the static friction between the pole groups of the tape moving system and the tape, and the tape will remain in contact with the rotary heads. In addition, it is impossible to obtain a desired slack in the tape, because of the mechanical returning motion of the tension pole which is provided in the tape moving system for the purpose of detecting the tape tension. The returning motion of this tension pole is toward a direction for applying tension or towards a direction for introducing slack in the tape, according to the designed location of the tension pole. The quantity of the returning motion of the tension pole depends on the diameter of the roll remaining on the reel when the tension is released, the type of cassette, and the like, and this quantity is not constant.

If excessive slack is introduced in the tape, the tape will run off the tape moving path. In such a case, when the mode of the apparatus is thereafter set to a mode in which the original tape tension is applied to the tape, the tape may hit the edge parts of the guide poles and the like and become damaged. On the other hand, if the slack is insufficient, it is impossible to achieve the original object, that is, to prevent the tape from becoming damaged by the contact between the rotary heads and the tape.

Therefore, the slack in the tape must be strictly controlled, however, such control was difficult to carry out in practice because of the returning motion of the tension pole described heretofore.

SUMMARY OF THE INVENTION

Accordingly, it is a general object of the present invention to provide a novel and useful temporary stop mode cancellation device for cancelling a temporary stop mode in which the tape travel is temporarily stopped in a recording and/or reproducing apparatus.

Another and more specific object of the present invention is to provide a temporary stop mode cancellation device which is designed so that a capstan which remained stationary is rotated in a reverse direction for a short period of time when a temporary stop mode is continued for a first predetermined time so as to introduce slack in the magnetic tape which is in contact with a drum which carries rotary heads, and so that the rotary heads are caused to stop rotating when a second predetermined time elapses from this point in time so as to put the apparatus in a stop mode.

Other objects and further features of the present invention will be apparent from the following detailed description when read in conjunction with the accompanying drawings.

DETAILED DESCRIPTION

Figure 1:
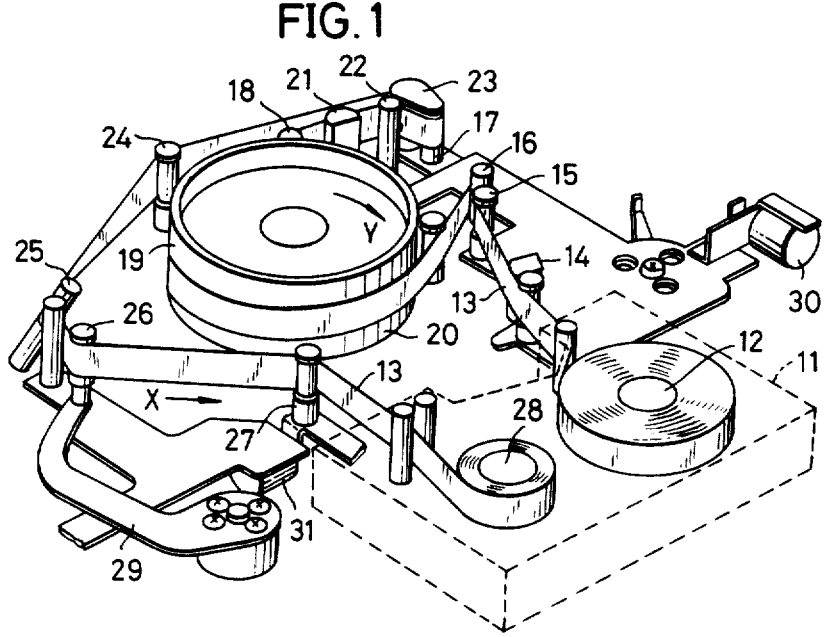
FIG. 1 is a perspective view showing an example of a recording and/or reproducing apparatus which may be applied with a temporary stop mode cancellation device according to the present invention.
Figure 2:
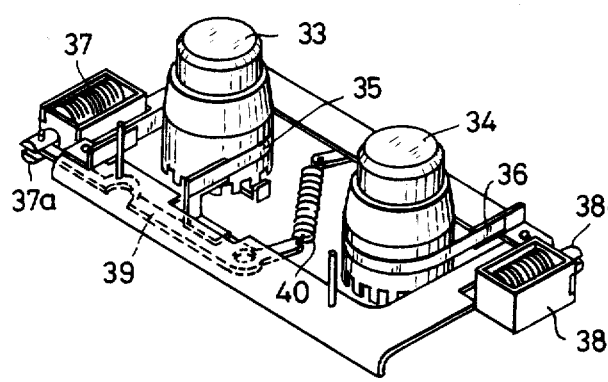
FIG. 2 is a perspective view showing a reel disc device part of the apparatus shown in FIG. 1.
Figure 3:
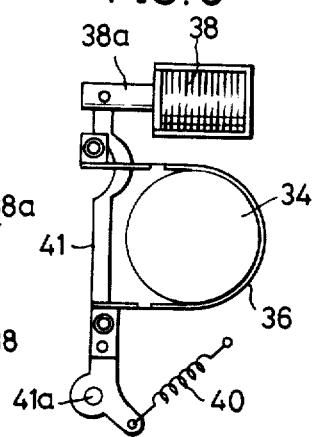
FIG. 3 is a bottom view showing a supply reel disc device shown in FIG. 2.

First, general description will be given with respect to an example of a recording and/or reproducing apparatus which may be applied with the temporary stop mode cancellation device according to the present invention, by referring to FIGS. 1 through 3 FIG. 1 shows the recording and/or reproducing apparatus in a state where a magnetic tape 13 is drawn out from a tape cassette 11 indicated by a dotted line, and loaded unto a predetermined tape path. The tape 13 which is paid out from a supply reel 12 within the tape cassette 11, makes contact with an erasing head 14, a guide pole 15, and a supply tension pole 16. The tape 13 is then wrapped around peripheral surfaces of a rotary drum 19 and a stationary drum 20, to make contact with the peripheral surfaces of the drums 19 and 20 throughout an angular range which is slightly larger than 180°. This angular range is determined by guide poles 17 and 18. The tape 13 further makes contact with audio and control head 21 and passes between a capstan 22 and a pinch roller 23. The tape path changes at the pinch roller 23, and the tape 13 makes contact with return poles 24 and 25, a loading pole 26, and a take-up tension pole 27, to be finally taken up by a take-up reel 28.

When forming the predetermined tape path described above, the tape 13 which is accommodated within the tape cassette 11 is drawn out of the tape cassette 11 by the loading pole 26 which is provided at the tip end of a loading arm 29. Then, a ring (not shown) which surrounds the drums 19 and 20 is rotated. The guide pole 17 which is provided on this ring moves the tape 13 as the ring rotates, to form the predetermined tape path.

A pair of mutually opposing video heads (not shown) are fixed to the bottom surface of the rotary drum 19. The rotary drum 19 is rotated by a head motor, and rotates in the direction of an arrow Y in synchronism with the video heads. In addition, during a normal recording mode or a normal reproducing mode, the pinch roller 23 is pressed against the capstan 22 with the tape 13 pinched therebetween, and the tape 13 is accordingly moved in the direction of an arrow X to be taken up by the take-up reel 28.

A core of a differential transformer 30 is displaced according to the rotation of the supply tension pole 16, and a code of a differential transformer 31 is displaced according to the rotation of the take-up tension pole 27. These differential transformers 30 and 31 are provided for detecting the tape tension introduced by the tension poles 16 and 27.

In FIG. 2, a take-up reel disc 33 and a supply reel disc 34 are respectively rotated by a reel motor, and the take-up reel disc 33 rotates the take-up reel 28. The supply reel disc 34 rotates the supply reel 12. Brake bands 35 and 36 are respectively wrapped around the reel discs 33 and 34, and both ends of the brake band 35 are fixed to an arm 39. One end of the arm 39 is fixed to a plunger rod 37a which is drawn inwards when a solenoid 37 is energized, and the other end of the arm 39 is fixed to a spring 40. Similarly, as shown in FIG. 3, both ends of the brake band 36 are fixed to an arm 41. One end of this arm 41 is fixed to a plunger rod 38a which is drawn inwards when a solenoid 38 is energized, and the other end of this arm 41 is fixed to the spring 40.

Figure 4:
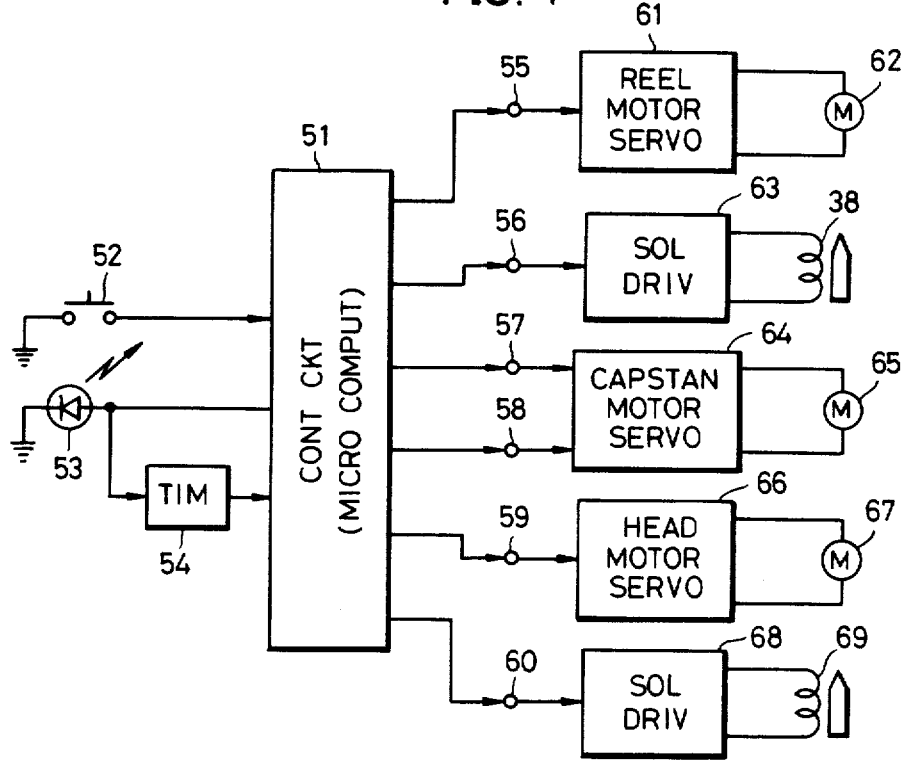
FIG. 4 is a systematic block diagram showing an embodiment of a temporary stop mode cancellation device according to the present invention, which may be applied to the apparatus shown in FIG. 1.

Next, description will be given with respect to an embodiment of a temporary stop mode cancellation device according to the present invention, which is applied to the recording and/or reproducing apparatus described heretofore, by referring to FIGS.4 through 7. In FIG. 4, a control circuit 51 may be constituted from a microcomputer, and various signals which will be described hereinafter are generated by this control circuit 51.

For example, when carrying out a still-picture reproduction during the normal reproduction mode, a normally open switch 52 for still picture reproduction mode is closed. This switch 52 is an automatically returning type switch. When the switch 52 is closed, a low-level signal is applied to the control circuit 51. Then, the control circuit 51 supplies a capstan rotation stopping signal to a capstan motor servo circuit 64, through an output terminal 57, so as to stop the rotation of a capstan motor 65 and accordingly stop the rotation of the capstan 22. In this state, the pinch roller 23 remains pressed against the capstan 23 with the tape 13 pinched therebetween. On the other hand, when the switch 52 is closed during a stop mode so as to carry out a still-picture reproduction, the capstan motor 65 remains stopped, and the pinch roller 23 presses against the capstan 22. A take-up reel motor for the take-up reel disc 33, and a supply reel motor for the supply reel disc 34, are each applied with a signal so as to rotate in respective directions and apply tension to the tape 13. Accordingly, the reels 28 and 12 do not rotate, and the tape travel stops in a state where a predetermined tension is applied to the tape 13 by being pulled by the two reels 28 and 12. In this state, the solenoids 37 and 38 continue to be energized, and the brake bands 35 and 36 are slackened. Thus, in this state, the braking with respect to the reel discs 33 and 34 by these brake bands 35 and 36 is released. The control circuit 51 continues to apply a driving signal to a head motor servo circuit 66 through an output terminal 59, to continue rotating a head motor 67 which rotates the rotary drum 19. Hence, the video heads which are provided on the rotary drum 19 scan along the oblique tracks on the tape 13 to reproduce the recorded signal. The still-picture reproduction is thus carried out.

Figure 5:
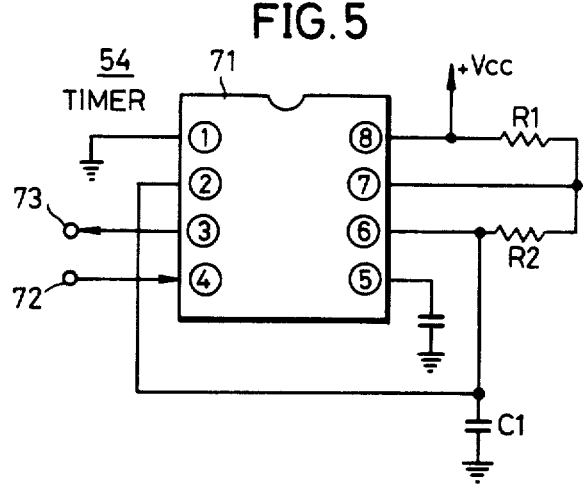
FIG. 5 is a circuit diagram showing an embodiment of a timer in the block system shown in FIG. 4.
Figure 6:
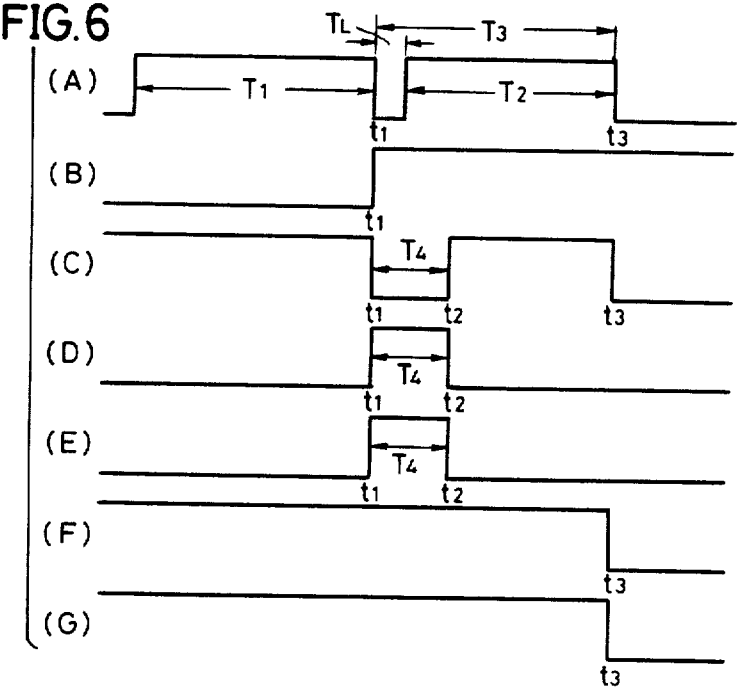
FIGS. 6(A) through 6(G) are graphs respectively showing signal waveforms at each part of the block system shown in FIG. 4.

In addition, the control circuit 51 supplies a high-level still-picture reproduction mode indicator driving signal to a light-emitting diode (LED) 53 for indicating the still-reproduction mode, so as to turn ON the LED 53 and indicate that the apparatus is in the still-picture reproduction mode. Further, the control circuit 51 also supplies the still-picture reproduction mode indicator driving signal to a timer 54 so as to start the operation of the timer 54. This timer 54 has a circuit construction shown in FIG. 5. As shown in FIG. 5, the timer 54 comprises an integrated circuit (IC) 71 used as a monostable multivibrator (a chip No. 555, for example), a capacitor C1 connected between a pin 6 and ground, and resistors R1 and R2 connected in series between the pin 6 and a power source voltage +Vcc with a connection point between the resistors R1 and R2 being connected to a pin 7. A pin 1 of the IC 71 is grounded, and a pin 2 is connected to the pin 6. A pin 8 is connected to the power source voltage +Vcc.

The still-picture reproduction mode indicator driving signal obtained from the control circuit 51, is applied to a pin 4 of the IC 71 through an input terminal 72 shown in FIG. 5. The IC 71 generates a timer output signal shown in FIG. 6(A). The timer output signal assumes a high level during a time interval T1 which is determined by the product of a sum of the resistances of the resistors R1 and R2 and the capacitance of the capacitor C1, assumes a low level only during a time interval $T_L$ which is determined by the capacitance of the capacitor C1 and the resistance of the resistor R2, and further assumes a high level during a time interval T2. This timer output signal is produced from a pin 3 of the IC 71, and supplied to the control circuit 51 through an output terminal 73. The capacitor C1 discharges during the interval $T_L$. However, the capacitor C1 is not fully discharged because the interval TL is extremely short, and for this reason, the interval T2 is shorter than the interval T1.

At a first fall in the timer output signal, that is, at a time t1 after the still-picture reproduction mode is continued for the interval T1, the control circuit 51 generates a take-up reel motor stopping signal shown in FIG. 6(B). This take-up reel motor stopping signal is supplied to a reel motor servo circuit 61 through an output terminal 55. Thus, a driving current is no longer applied to a take-up reel motor 62. As a result, tension is no longer applied to the tape 13 by the reel motor. In addition, a current which is supplied to a solenoid driving circuit 63 through an output terminal 56 of the control circuit 51, ceases for a time interval T4 between times t1 and t2 as shown in FIG. 6(C). Hence, the energizing current supplied to the solenoid 38 ceases during the interval T4. Accordingly, the arm 41 is rotated counterclockwise in FIG. 3 about a pin 41a due to a force exerted by the spring 40, and the plunger rod 38a is pushed to project so that the brake band 36 is pressed against the peripheral surface of the supply reel disc 34. As a result, the reel disc which introduces the slack in the tape 13, that is, the supply reel disc 34, is subjected to the braking by the brake band 36.

Furthermore, the control circuit 51 supplies a capstan driving signal shown in FIG. 6(D) to the capstan motor servo circuit 64 through the output terminal 57, for the interval T4 from the time t1. At the same time, a capstan reverse rotation signal shown in FIG. 6(E) is supplied to the capstan motor servo circuit 64 through an output terminal 58. Accordingly, during the interval T4, the capstan motor 65 is caused to undergo reverse rotation at a rotational speed which is approximately 1/5 the rotational speed of the capstan motor 65 during the normal recording or normal reproduction, for example. Because the capstan 22 is thus caused to undergo reverse rotation, the tape 13 is drawn out of the take-up reel 28 and moves in a direction opposite to the normal moving direction X at a tape speed which is approximately 1/5 the tape speed during the normal recording or normal reproduction during the interval T4, before stopping at the time t2. Therefore, slack is introduced in the tape 13, and the tape 13 no longer makes contact with the peripheral surface of the rotary drum 19. In this state, the supply reel 12 is subjected to the braking and is stopped. Moreover, the slack introduced in the tape 13 can be controlled accurately because the capstan 22 undergoes reverse rotation during the interval T4 which is a constant interval. The still-picture reproduction mode is cancelled after the still-picture reproduction mode is continued for the interval T1, and a constant slack in the tape 13 is ensured. A solenoid driving current is supplied to the solenoid driving circuit 63 from the control circuit 51 at the time t2, as shown in FIG. 6(C). Thus, the solenoid 38 is energized by the solenoid driving current, and the braking with respect to the supply reel disc 34 by the brake band 36 is released.

In this state, the control circuit 51 supplies a head motor driving signal shown in FIG. 6(F) to the head motor servo circuit 66, through the output terminal 59. Hence, the head motor 67 continues to be rotated, and the rotary drum 19 accordingly continues to rotate. The video heads continue to rotate together with the rotary drum 19 in this manner, however, the unwanted contact between the tape 13 and the video heads is prevented because the capstan 22 undergoes reverse rotation to introduce slack in the tape 13 after the time t1.

After the interval T2 elapses after the interval $T_L$, that is, when a time interval T3 from the time t1, the output of the timer 54 falls again at a time t3 as shown in FIG. 6(A). This means that the signal supplied to the control circuit 51 from the timer 54 falls when the apparatus continues to assume the mode in which the still-picture reproduction mode is cancelled, for the interval T3. Hence, the head motor driving signal shown in FIG. 6(F) which is supplied to the head motor servo circuit 66 from the control circuit 51, ceases at the time t3. As a result, the head motor 67 stops rotating at the time t3. In addition, a solenoid driving signal shown in FIG. 6(G) which is generated by the control circuit 51 and supplied to a solenoid driving circuit 68 through an output terminal 60, ceases at the time t3. Accordingly, an energizing current is no longer supplied to a solenoid 69 which makes the solenoid 69 inoperative, and the pinch roller 23 therefore separates from the capstan 22. At the same time, the solenoid driving signal shown in FIG. 6(C) ceases at the time t3, and the solenoid 38 becomes inoperative. Thus, the brake band 36 applies a braking force to the supply reel disc 34 due to the force exerted by the spring 40.

Accordingly, when the still-picture reproduction mode in which the tape 13 is stationary and the video heads repeatedly scan over the same track on the tape 13 continues for the first predetermined interval T1, the still-picture reproduction mode is automatically cancelled. Further, when this cancelled state is continued for the second predetermined interval T3, the apparatus is automatically set to the stop mode. During this stop mode, the rotation of the rotary drum 19 is stopped, and the pinch roller 23 is separated from the capstan 22.

The operation described heretofore not only applies to the case where the still-picture reproduction mode is set, but also applies to a case where a pause mode is set during the normal recording mode so as to temporarily stop the recording operation, for example.

From the point of view of preventing the tape 13 and the heads from becoming damaged, it is desirable to make the intervals T1 and T2 short. However, it must be taken into consideration that the still-picture reproduction must be continued for at least a desired time interval, and that it takes a certain time to find an editing point when carrying out an electronic editing operation. Therefore, in a concrete embodiment of the invention, the interval T1 is selected in the range of two minutes and thirty seconds, and the interval T2 is selected in the range of one minute and thirty seconds. In addition, the interval T4 is selected in the range of 0.5 second.

Figure 7:
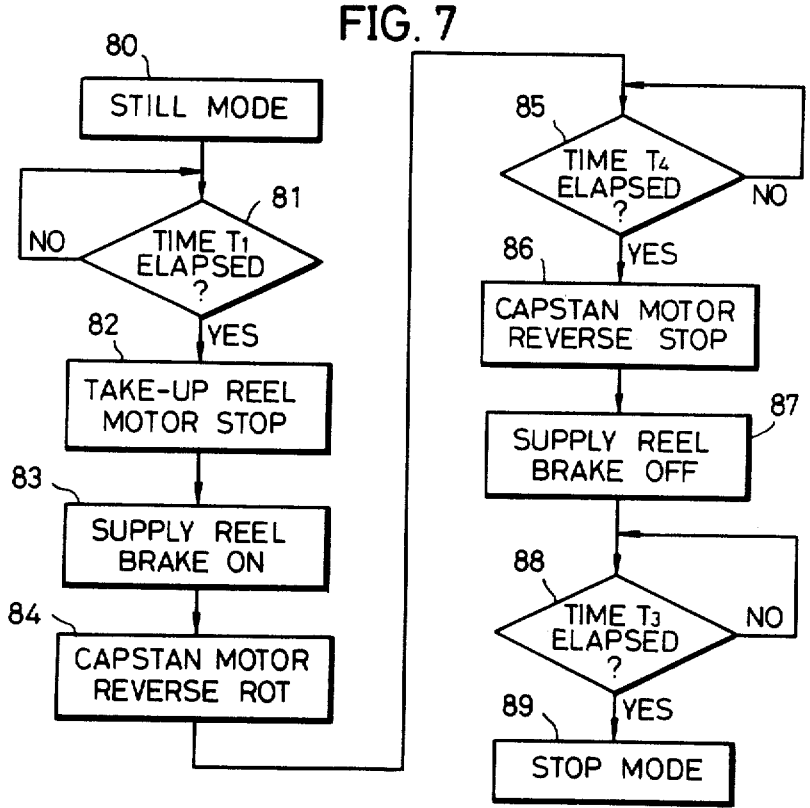
FIG. 7 is a flowchart for explaining the operation of a microcomputer in the block system shown in FIG. 4.

Next, description will be given with respect to the operation of a microcomputer for a case where the control circuit 51 is constituted from a microcomputer, by referring to a flowchart in FIG. 7. In FIG. 7, when the apparatus is set to the still-picture reproduction mode at a step 80, a step 81 discriminates whether the interval T1 has elapsed from the time when the still-picture reproduction mode has been set. The step 81 continues to carry out the discrimination until it is discriminated that the interval T1 has elapsed. A subsequent step 82 is performed when the step 81 discriminates that the interval T1 has elapsed. The step 82 stops the rotation of the take-up reel motor 62. The energizing current is no longer supplied to the solenoid 38 at a step 83, and the braking is applied with respect to the supply reel disc 34. The capstan motor 65 is caused to undergo reverse rotation at a step 84. A step 85 discriminates whether the interval T4 has elapsed from the time when the capstan motor 65 was caused to undergo reverse rotation When the step 85 discriminates that the interval T4 has elapsed, the reverse rotation of the capstan motor 65 is stopped at a step 86. Further, the solenoid 38 is energized at a step 87, so as to release the braking with respect to the supply reel disc 34. A step 88 discriminates whether the interval T3 has elapsed. When the step 88 discriminates that the interval T3 has elapsed, a step 89 puts the apparatus in the stop mode at the time t3.

Further, the present invention is not limited to these embodiments, but various variations and modifications may be made without departing from the scope of the present invention.

What is claimed is:

1. A temporary stop mode cancellation device for cancelling a temporary stop mode in which the tape travel of a magnetic tape is temporarily stopped in a recording and/or reproducing apparatus, said recording and/or reproducing apparatus at least comprising a capstan motor for rotating a capstan which causes the magnetic tape to travel, a take-up reel motor for rotating a take-up reel, and a head motor for rotating heads which record and/or reproduce a signal onto and/or from the magnetic tape, said temporary stop mode cancellation device comprising:

timer means for producing a first signal when a first predetermined time interval T1 elapses from a time when said recording and/or reproducing apparatus is set to a mode in which the rotation of the capstan motor is temporarily stopped and the tape travel of said magnetic tape is temporarily stopped, and for producing a second signal when a second predetermined time interval T3 elapses from a time when said first predetermined time interval T1 has elapsed; and control circuit for producing a third signal for stopping the rotation of the take-up reel motor, and for producing a fourth signal during a third predetermined time interval T4 so as to rotate the capstan motor in a direction in reverse to a normal rotating direction of the capstan motor and to move said magnetic tape in a reverse direction, when supplied with said first signal from said timer means, said control circuit producing a fifth signal for stopping the rotation of the head motor, when supplied with said second signal from said timer means.

2. A cancellation device as claimed in claim 1 in which said recording and/or reproducing apparatus further comprises braking means for braking the rotating supply reel, and said control circuit further produces and supplies a signal to said braking means during said third predetermined time interval T4 so as to stop the rotation of the head motor, when supplied with said first signal from said timer means.

3. A cancellation device as claimed in claim 1 in which said recording and/or reproducing apparatus further comprises pressing means for pressing a pinch roller against the capstan, and said control circuit produces a signal for operating said pressing means to continuously press said pinch roller against said capstan during the temporary stop mode in which the tape travel of said magnetic tape is temporarily stopped, and for operating said pressing means to release the pressing contact between said pinch roller and said capstan when said control circuit is supplied with said second signal from said timer means.

4. A cancellation device as claimed in claim 1 in which said timer means comprises a monostable multivibrator for producing a signal which assumes a high level during said first predetermined time interval T1, assumes a high level after once assuming a low level after said first predetermined time interval T1 elapses, and again assumes a low level after said second predetermined time interval T3 elapses, said first signal corresponds to a fall from the high level to low level after said first predetermined time interval T1 elapses, and said second signal corresponds to a fall from the high level to low level after said second predetermined time interval T3 elapses.

5. A cancellation device as claimed in claim 1 in which said third predetermined time interval T4 is selected to a time of approximately 0.5 second.

* * * * *